(12) United States Patent
Kouisni et al.

(10) Patent No.: US 9,091,023 B2
(45) Date of Patent: *Jul. 28, 2015

(54) METHOD FOR SEPARATING LIGNIN FROM BLACK LIQUOR

(71) Applicant: FPINNOVATIONS, Pointe-Claire (CA)

(72) Inventors: Lamfeddal Kouisni, St-Leonard (CA); Michael Paleologou, Beaconsfield (CA)

(73) Assignee: FPINNOVATIONS, Pointe-Claire (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,907

(22) Filed: Dec. 16, 2014

(65) Prior Publication Data

US 2015/0096697 A1  Apr. 9, 2015

Related U.S. Application Data

(63) Continuation of application No. 14/284,558, filed on May 22, 2014, now Pat. No. 8,940,130, which is a continuation of application No. 13/118,666, filed on May 31, 2011, now Pat. No. 8,771,464.

(51) Int. Cl.
*D21C 11/00* (2006.01)
*C08H 8/00* (2010.01)
*C07G 1/00* (2011.01)

(52) U.S. Cl.
CPC .............. *D21C 11/0057* (2013.01); *C07G 1/00* (2013.01); *C08H 8/00* (2013.01); *D21C 11/0007* (2013.01)

(58) Field of Classification Search
USPC .......................................................... 162/16
See application file for complete search history.

(56) References Cited

U.S. PATENT DOCUMENTS

| | | | |
|---|---|---|---|
| 2,406,867 | A | 9/1946 | Tomlinson, Jr. |
| 4,521,336 | A | 6/1985 | Dilling |
| 2003/0041982 | A1 | 3/2003 | Prior |
| 2008/0121356 | A1 | 5/2008 | Griffith |

FOREIGN PATENT DOCUMENTS

| | | |
|---|---|---|
| CA | 1335976 | 6/1995 |
| GB | 664811 | 1/1952 |
| WO | 20060031175 | 3/2006 |

(Continued)

OTHER PUBLICATIONS

Hassan Loutfi, Brian Blackwell and Vic Uloth, Lignin recovery from kraft black liquor: preliminary process design; Jan. 1991 Tappi Journal, pp. 203-210.

(Continued)

*Primary Examiner* — Jacob Thomas Minskey
(74) *Attorney, Agent, or Firm* — Norton Rose Fulbright Canada LLP

(57) ABSTRACT

A method was developed for: a) improving the filterability of acid-precipitated lignin from kraft black liquors, b) increasing the dry solids content of the final lignin product, c) reducing the acid requirements and d) minimizing or eliminating TRS emissions during the acidification of black liquor to produce lignin and/or the subsequent suspension of the lignin in acid and/or the washing of the lignin with acid. No major difference in the chemical composition, MWD and main functional groups was found in the lignin of the present invention compared with lignins produced by conventional methods.

18 Claims, 3 Drawing Sheets

(56) References Cited

FOREIGN PATENT DOCUMENTS

| | | |
|---|---|---|
| WO | 2009104995 | 8/2009 |
| WO | 2011037967 | 3/2011 |

OTHER PUBLICATIONS

V.C. Uloth and J.T. Wearing, Kraft lignin recovery: Acid precipitation versus ultrafiltration Par I: Laboratory test results, Pulp & Paper Canada 90:9 (1989), pp. 67 to 71.

V.C. Uloth and J.T. Wearing, Kraft lignin recovery: Acid precipitation versus ultrafiltration Part II: Technology and economics, Pulp & Paper Canada 90:10 (1989), pp. 34 to 37.

H. Loutfi, Lignin Recovery from Kraft Black Liquor: Carbon Dioxide Precipitation, Conference Title: Pacific Pap. Expo Tech. Conf., Prog. 1: Pulping Source: Pacific Pap. Expo Tech. Conf., Prog. 1: Pulping: 1-4-0-1-4-12 (Nov. 6-9, 1990).

Peter Mauro Ricca, A Study in the Oxidation of Kraft Black Liquor, Ph.D thesis, University of Florida, 1962, Tables 10 and 11, pp. 73-74.

H.A. Hermans and T.M. Grace, The Effect of Oxidation on Black Liquor Composition and Properties, 1984 Tappi Pulping Conference, pp. 575-578.

Mark H. Kirby, Economic and Process Considerations in the Use of Oxygen for Black Liquor Oxidation, Nov. 21-25, 1988.

Supplementary European Search Report—dated Aug. 1, 2014—EP 11 78 9017.

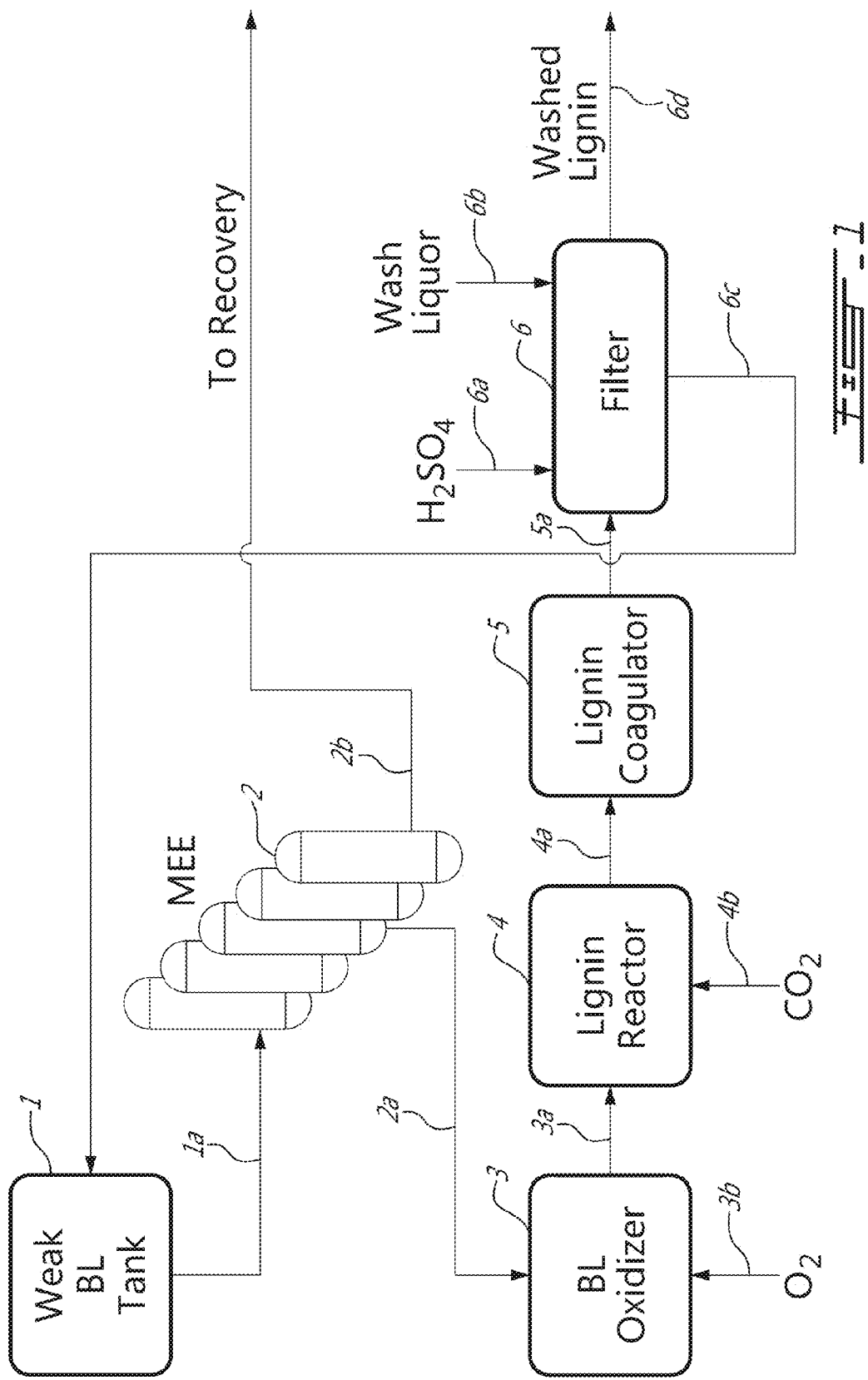

METHOD FOR SEPARATING LIGNIN FROM BLACK LIQUOR

CROSS-REFERENCE TO RELATED APPLICATION

This application is a Continuation of U.S. Ser. No. 14/284,558, filed May 22, 2014 and which is a Continuation of U.S. Ser. No. 13/118,666 filed May 31, 2011 which issued as U.S. Pat. No. 8,771,464; and claims the benefit under 35 USC 119(e) of U.S. Provisional Application 61/350,969, filed Jun. 3, 2010.

BACKGROUND OF THE INVENTION a) Field of the Invention

The invention relates to a method for separating lignin from black liquor, and more especially a black liquor pretreatment method for reducing the acid requirements and improving the filterability of lignin slurries produced from the addition of acid to black liquors.

b) Description of Prior Art

It is well established in the prior art that, depending on the black liquor pH and the lignin molecular weight (MW), the lignin is either dissolved or dispersed in black liquor in the colloidal form with the colloidal dispersion being stabilized by charged phenolic and carboxylic acid groups on the lignin (Marton, J., On the structure of kraft lignin, Tappi, 47(11), 713-719 (1964). Each lignin colloid carries a negative charge which produces an electrostatic repulsion force between adjacent particles. If the charge is sufficiently high, the lignin colloids will remain discrete, disperse and in suspension. Reducing or eliminating the charge has the opposite effect leading to lignin particle agglomeration and settling out of solution (lignin precipitation). As a result, the stability of lignin solutions and/or dispersions can be affected by such factors as pH, ionic strength, temperature and surface-active agents (Norgren, M., Some aspects on the physical chemistry of kraft lignins in aqueous solutions. Theoretical considerations and practical implications, Lic. Thesis, Mid Sweden University, Sundsvall, Sweden, 2000; Norgren, M. and Edlund, H., Stabilization of kraft lignin solutions by surfactant additions, Colloids and Surfaces, A: Physicochemical and Engineering Aspects, 194 (1-3), 239,-248 (2001). As in other types of colloidal dispersions, lignin precipitation from black liquor is assumed to occur in two steps: nucleation and particle growth. It is the relative rates of these two steps that ultimately determine the size of the precipitated lignin particles. Over the last seventy years, several methods exploited the colloidal nature of lignin in black liquor to aggregate and coalesce it to larger particles thus facilitating its separation from black liquor through filtration. Such methods include: lignin precipitation by acidification to lower the black liquor pH, changing the ionic strength of lignin solutions using, for example, alcohols and/or calcium salts, addition of surface-active agents and membrane separation. Presently, lignin precipitation by acidification is the most common method used for lignin recovery. A number of such processes exist (e.g. Uloth, V. C. and Wearing, J. T., Kraft lignin recovery: acid precipitation versus ultrafiltration. Part I. Laboratory test results" Pulp & Paper Canada, 90(9), 67-71 (1989); Uloth, V. C. and Wearing, J. T., Kraft lignin recovery: acid precipitation versus ultrafiltration. Part II. Technology and economics" Pulp & Paper Canada, 90(10), 34-37 (1989); Loutfi, H., Blackwell, B. and Uloth, V., Lignin recovery from kraft black liquor: preliminary process design; Tappi Journal, 203-210, January 1991; Ohmann, F., Theliander, H., Tomani, P. and Axegard, P., Method for separating lignin from black liquor, WO2006/031175 A1). In most of these processes, the black liquor acidification is predominantly performed by using either carbon dioxide or a mineral acid (e.g. sulphuric acid) or a combination of the two to drop the pH of the black liquor from about 13-13.5 to 9-10. After acidification, the lignin is usually filtered and washed with acid (e.g. sulphuric acid) and water to produce lignin of high purity. In many cases, however, it is difficult to separate the lignin from the acidified black liquor solutions. In an effort to improve the filtration properties of acid-precipitated lignin slurries, a number of approaches have been considered in the prior art including filtration at high temperatures (80° C.-90° C.), increased ionic strength and reduced precipitation pH. Even though these approaches work to a certain extent, the filtration resistance is still quite high leading to unreasonably low filtration rates and, in certain cases, a lignin product of low dry solids content. This, in turn, leads to a large filtration area being required in the equipment needed for lignin filtration leading to high capital costs as well as increased drying costs for the lignin. A second problem associated with most lignin precipitation processes using acid is the large amount of acid (e.g. carbon dioxide and/or sulphuric acid) that is needed to induce the lignin to come out of solution and/or be converted from the sodium to the hydrogen form (e.g. during suspension of the lignin cake in an acid solution or the washing of the lignin with acid on the filter). A third problem associated with most lignin acid precipitation processes is the emission of totally reduced sulphur (TRS) compounds during most stages of the process. Such compounds which include hydrogen sulphide, methyl mercaptan, dimethyl sulphide and dimethyl disulphide are strongly odorous compounds with well-known negative effects on human health and other forms of life.

SUMMARY OF THE INVENTION

It is an object of this invention to provide improvements in a process for removing lignin from black liquor.

It is another object of this invention to provide a process for separating lignin from black liquor.

In one aspect of the invention, there is provided in a process for removing lignin from black liquor by acidifying the black liquor and filtering the acidified black liquor, the improvement wherein the black liquor is oxidized prior to said acidifying.

In another aspect of the invention, there is provided a process for separating lignin from black liquor comprising:
  a) oxidizing black liquor containing lignin to destroy total reduced sulphur (TRS) compounds in the black liquor,
  b) acidifying the oxidized black liquor to precipitate lignin from the black liquor, and
  c) filtering precipitated lignin particles from the acidified liquor.

In still another aspect of the invention, there is provided a process for separating lignin from black liquor comprising:
  a) oxidizing black liquor containing lignin to destroy total reduced sulphur (TRS) compounds in the black liquor as well as oxidize certain organics to organic acids,
  b) acidifying the oxidized black liquor to precipitate lignin from the black liquor,
  c) filtering precipitated lignin particles from the acidified liquor, and
  d) washing the precipitated lignin particles with sulphuric acid and water.

DETAILED DESCRIPTION OF THE INVENTION

It must clarified here that in the context of this invention, the acidification of black liquor can be conducted by any one or more of several acids such as: purchased carbon dioxide, sulphur dioxide, sulphuric acid, methane sulphonic acid and other organic acids (e.g. acetic acid and formic acid) or an acid-containing stream at a kraft pulp mill such as flue gases from the lime kiln or other combustion device or gas emitted from effluent treatment systems (e.g. UNOX) which is rich in carbon dioxide, spent acid from the chlorine dioxide generator, the tall oil plant or the demineralizer plant which are rich in sulphuric acid or a stream from a chip-prehydrolysis stage which is rich in acetic acid. To avoid disturbing the mill's sodium/sulphur balance, it is preferred that non-sulphur containing acids are used in the black liquor acid precipitation and washing steps (e.g. carbon dioxide, acetic acid, formic acid) thereby minimizing caustic make-up requirements to the kraft recovery cycle. Since, however, most of these acids are weak acids, their use is usually limited to the black liquor precipitation step. To achieve good lignin washing, stronger acids are needed (e.g. sulphuric acid). Other strong acids could be used as well (e.g. hydrochloric acid, nitric acid) but the use of these should be avoided since, if all filtrates from the lignin plant were to be returned to the kraft recovery cycle, they would carry with them undesired non-process elements such as chlorine (in the form of chloride) and nitrogen (in the form of nitrate).

It has been found, in accordance with the invention, that by partially oxidizing black liquor using oxygen to the extent needed to destroy TRS components prior to lignin precipitation with acid, the filtration rate of the acid-precipitated lignin slurry improves significantly. This is a very surprising result considering that the opposite effect was suggested in the prior art (e.g. Tomlinson, G. H. and Tomlinson, G. H. Jr., Method of treating lignocellulosic material, U.S. Pat. No. 2,406,867 (1946); Ohman, F., Precipitation and separation of lignin from kraft black liquor, Ph.D. Thesis, Chalmers University of Technology, SE-412 96, Gothenburg, Sweden, p. 12). It appears from the data that black liquor oxidation provides suitable conditions for lignin colloid agglomeration with respect to pH (leads to a lower pH), temperature (leads to a higher temperature) and the relative valence of the inorganic electrolytes in solution (e.g. oxidation converts sodium hydrosulphide, a salt in which both the cation and anion are monovalent to sodium thiosulphate and sodium sulphate in which the cation is monovalent but the anion is divalent). In addition, black liquor oxidation prior to lignin precipitation leads to a final lignin product of a higher dry solids content compared to unoxidized black liquor.

Furthermore, it has been found that this black liquor pretreatment step led to reduced acid requirements for the acidification step during lignin precipitation from black liquor, reduced acid requirements during the washing step, and reduced TRS emissions during all steps associated with lignin precipitation, filtration and washing. These improvements in acid requirements can be explained by the fact that the oxidation of sulphide to sulphate and organics (e.g. sugars) to organic acids (e.g. sugar acids) consumes the residual effective alkali (sodium hydroxide) in black liquor.

While limiting the extent of black liquor oxidation to the point at which TRS compounds are mostly destroyed is sufficient for the invention, further reductions in acid consumption for lignin precipitation can be achieved by intensifying (e.g. by using higher temperatures) and/or extending the oxidation treatment, for example with oxygen, to allow for hemicelluloses in the black liquor to be oxidized to their corresponding isosaccharinic acids or even further to acetic acid, formic acid, lactic acid, or oxalic acid or carbon dioxide (Hermans, M. A. and Grace, T. M., The effect of oxidation on black liquor composition and properties, 1984 Pulping Conference, TAPPI Proceedings, 575-578). All these acids can consume the residual alkali in black liquor thereby reducing the amount of acidifier required for the acidification of the black liquor as well as the acidifier used in lignin washing. Suitable acidifiers include carbon dioxide and/or sulphuric acid. It should be noted here that if the latter acid is used in the black liquor acidification or the lignin washing steps, this will upset the sodium/sulphur balance in the kraft recovery cycle leading to higher caustic make-up requirements. Hence, any reduction in the sulphuric acid (or any other sulphur-containing acid such as methane sulphonic acid, sulphur dioxide, etc.) requirements of a lignin plant will inevitably lead to a reduction in the caustic make-up requirements of the kraft recovery cycle.

A second option following the destruction of TRS compounds, would be to simply let the black liquor stand for a certain period of time at a high temperature. In particular, in the absence of sodium sulphide and mercaptide, the hemicellulose in the black liquor is then amenable to peeling reactions which generate saccharinic acids (Increased yields in alkaline pulping. I. A study of the peeling reaction at the conditions of kraft pulping, Project 2942, Report 1, Dec. 18, 1970.), thereby consuming alkalinity and reducing the amount of acidifier required for the acidification of the black liquor.

One risk associated with any black liquor pretreatment approach involving oxygen prior to lignin precipitation is the oxidation of the lignin itself to produce carboxylated lignin. Even though this is expected to occur to a certain degree, it is also expected that because of the low pKa of the carboxylic acid group on carboxylated lignin (about 4), this type of lignin would be much more soluble in the pH range of 4-10 compared to lignin with very few or no carboxylic acid groups. Hence, most such lignin will not precipitate out at pH 10 and but will end up in the filtrate from the first filtration stage. Even though this would affect lignin recovery yield, this problem can easily be addressed by treating a larger flow of black liquor than otherwise anticipated. This will not necessarily affect the sizing of the belt filter or filter press used for lignin recovery following lignin precipitation from black liquor.

Generally, the acidifying is to a black liquor pH of not more than 10.8; in particular embodiments the acidifying is with an acidifier selected from carbon dioxide contained in a flue gas or the gaseous emissions from an effluent treatment system (e.g. UNOX) and the sulphuric acid used is that contained in the spent acid from the chlorine dioxide generator, the tall oil plant and/or the demineralizer plant; or the acidifying may be with sulphur dioxide, organic acids or acid contained in the hydrolysate from the pre-hydrolysis of wood chips prior to pulping (e.g. using steam, water or sulphuric acid).

The acidification brings the pH of black liquor close to the pKa (acidity constant) of the phenolic groups in lignin which is about 10. At this pH, 50% of the phenolic groups in lignin are in the sodium form (completely dissociated form) and the other 50% in the acidic form (mostly undissociated form). In this state, some lignin molecules (e.g. high MW) come out of solution and form colloidal particles which following agglomeration and coagulation (simply time in a tank) grow to particles of a size around 5-10 micron average diameter which are easy to filter.

It is possible to stop the acid addition at a higher pH (any pH less than 11) if one is interested in higher molecular weight lignins, but the yield will suffer.

It is also possible to stop the acid addition at a lower pH (e.g. pH 9) in which case the average molecular weight of the lignin recovered will be lower, the lignin recovery yield will be higher but the carbon dioxide consumption will be higher.

The latter is higher because the carbon dioxide not only neutralizes the residual sodium hydroxide in black liquor but also begins to react with the residual sodium carbonate to form sodium bicarbonate.

The benefits and objectives of taking lignin out of black liquor include:
1. To offload the recovery boiler with respect to calorific load thereby enabling recovery-boiler limited mills to produce more pulp (usually 1 more tonne of pulp per tonne of lignin taken out);
2. To enable the combustion of the lignin in the lime kiln (thereby displacing natural gas or bunker C oil—these are fossil fuels leading to GHG emissions) or the power boiler (thereby displacing hog fuel and/or fossil fuel);
3. To enable the use of the lignin in any one or more of several high-volume, high-value applications. Examples include:

as a dispersant in various applications (e.g. dyes in textiles)
as a binder in wood pellets to reduce dusting and improve packing density
as a replacement of phenol in phenol formaldehyde resins (e.g. resins used in plywood, OSB and other wood products)
as a replacement of carbon black in rubber products (e.g. tires)
as a feedstock for the manufacture of carbon fibers (in place of polyacrylonitrile)
as a replacement of petroleum-based polyols in the manufacture of rigid polyurethanes.

The Totally Reduced Sulphur (TRS) compounds commonly found in black liquor are:
a) hydrogen sulphide ($H_2S$);
b) mercaptan ($CH_3SH$);
c) dimethyl Sulphide ($CH_3S\ CH_3$); and
d) dimethyl Disulphide ($CH_3SSCH_3$).

While the invention is particularly described for the case in which oxidation is with oxygen, the invention is not limited to employing oxygen. Other oxidizing agents may be employed, for example air, emissions from an on-site effluent treatment system (50% oxygen, 50% carbon dioxide by volume: could conduct oxidation and precipitation at the same time), chemical oxidation—any one of several chemical agents could be used as long as they are cost-effective, compatible with the mill recovery cycle and they do not react with lignin), electrochemical oxidation, photochemical oxidation, etc.

In the process of the invention, sulphur species of the TRS are oxidized to such species as thiosulphate and sulphate (in the case of $H_2S$), methane sulphonic acid (in the case of mercaptan), dimethyl sulphoxide and dimethyl sulphone (in the case dimethylsulphide) and methane sulphonic acid (in the case of dimethyl disulphide). Oxidation reactions generate heat (they are exothermic). In addition, the reaction of any acid with a base (e.g. isosaccharinic acids with residual sodium hydroxide) generates heat. With increasing temperature the degree of dissociation of the lignin charged groups (e.g. phenolic groups) decreases leading to increased lignin colloid agglomeration and coagulation to form larger lignin particles (and larger particles lead to higher filtration rates). In addition, it is known from the literature that the lower the pH of the lignin slurry, the lower the filtration resistance (higher filtration rate). At lower pHs, there is less dissociation of the charged phenolic groups in lignin. Furthermore, simple inorganic electrolytes can have a significant impact on the dissociation of the lignin colloid charged groups. This effect will depend on the relative valence of the ions (e.g. ratio between the valences of the cation and anion of any given salt) as well as their concentration (ionic strength).

BRIEF DESCRIPTION OF THE DRAWINGS

FIG. 1 is a flowsheet of the process of this invention showing the black liquor oxidation step prior to black liquor acidification

DETAILED DESCRIPTION WITH REFERENCE TO DRAWING

Figure 2B:
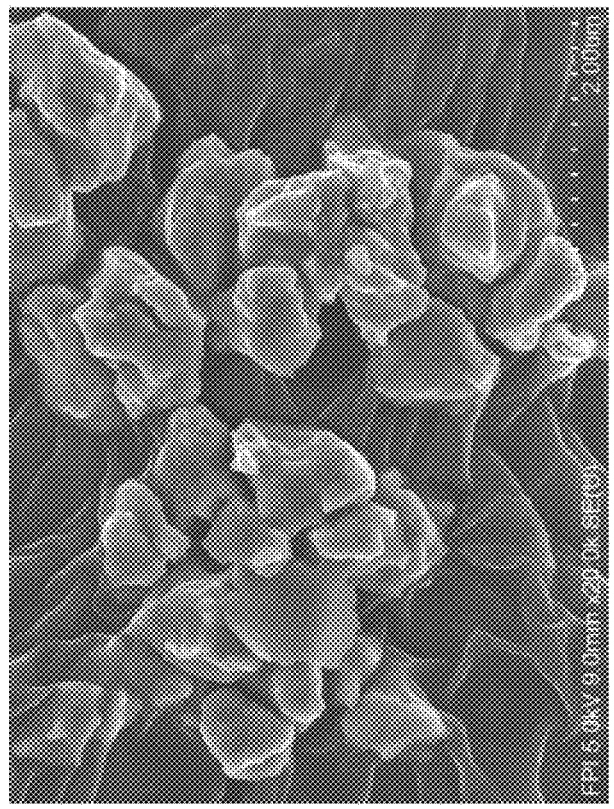
FIG. 2b is an SEM image of lignin in lignin slurry obtained from oxidized black liquor solution after acidification to pH 10 using carbon dioxide.

With further reference to FIG. 1, a lignin recovery assembly comprises a weak black liquor tank 1, a multiple effect evaporator (MEE) assembly 2, a black liquor oxidation reactor 3, a lignin precipitation reactor 4, a lignin coagulator 5 and a filter 6. Weak black liquor (e.g. 20% solids) is fed from black liquor tank 1 along flow line 1a to MEE assembly 2. The black liquor is heated in MEE assembly 2 to generate concentrated black liquor (e.g. 50% solids) which is directed to the mill recovery boiler along flow line 2b after being further concentrated (e.g. to 70-80% solids) in concentrators. Black liquor is fed from assembly 2 (at about 30-40% solids) along flow line 2a to a black liquor oxidation reactor Oxygen gas is fed along flow line 3b to the black liquor oxidation reactor 3 for oxidation of TRS and other compounds in the black liquor. The thus pre-treated black liquor is fed along flow line 3a to a lignin precipitation reactor 4, and $CO_2$ is fed as acidifying agent along flow line 4b to lignin reactor 4 to precipitate lignin in the liquor. The thus acidified liquor is fed along flow line 4a to lignin coagulator 5 in which the lignin precipitate is allowed to coagulate. Liquor with coagulated lignin is fed along flow line 5a to a filter 6 where lignin is filtered out of the liquor and filtered liquor is recycled in flow line 6c to weak black liquor tank 1. Lignin retained by filter 6 is washed with $H_2SO_4$ from line 6a and water from line 6b and washed lignin is recovered in line 6d. Alternatively, instead of washing the lignin on this filter with sulphuric acid, the lignin cake from filter 6 is suspended in dilute sulphuric acid to convert it from the sodium to the hydrogen form and then the lignin slurry is directed to a second filter for the washing of the lignin with dilute sulphuric acid and water. The washed lignin is dried by any suitable means, for example by pressing to remove excess water and air drying or using a rotary kiln.

Reference herein to amounts by % are % by weight unless indicated otherwise.

Reference herein to "average diameter" refers to the average diameter of particles having a range or distribution of sizes.

EXAMPLE 1

Lignin Precipitation and Filtration

Lignin was precipitated from 150 L of black liquor using $CO_2$. For the purpose of improving the lignin filtration properties, the black liquors were oxidized by blowing oxygen into the liquor at 75° C. using a sparger located at the bottom of the reactor. The oxidation reaction was monitored by measuring the amount of sulphide in the liquor and stopped at a sulphide concentration of about 0.6-0.8 g/L. The residual sulphide was monitored on-line using the BLOX sensor previously developed at FPInnovations Paprican Division. Lignin precipitation from black liquor was conducted by blowing $CO_2$ into the black liquor solution using the same sparger that is used for the oxidation step. The precipitation temperature was kept at 75° C. The precipitation was stopped at pH around 10. The lignin slurry was agitated gently in the same tank in order to allow the lignin particles to grow. After coagulation at 65-70° C., the lignin slurry was filtered using a LAROX filter press (Model PF 0.1 H2). The filter area was 0.1 m². A standard filter cloth from Tamfelt (S-2108-L1) was used. The filtration cycle was as follows: first filtration (formation of the first cake: Na-lignin), followed by pressing; re-slurrying the first cake in sulphuric acid and adjusting the pH to about 2 to 4; second filtration (formation of the second cake: H-lignin), followed by pressing, washing with acidic wash water (pH=2) and water, pressing, and finally air drying. When no re-slurrying step was used, the filtration cycle included the following steps: formation of the lignin cake, washing with 0.4N sulfuric acid followed by 0.01N sulfuric acid, and water; pressing; and, finally, air drying.

The filtration rate in kg/m²·h (kilograms of recovered lignin filtered per unit surface area per hour) was evaluated for lignin recovered from oxidized and non-oxidized black liquors. With no black liquor pre-treatment (oxidation), the filtration rate was about 50 to 60 kg/m²·h for the first filtration step and 20 to 30 kg/m²·h for the second filtration step. When the black liquor was oxidized, the filtration rate was about 150 to 180 kg/m²·h in the first filtration step and 100 to 125 kg/m²·h in the second filtration step. It is important here to mention that the calculation of the filtration rate for the second filtration step takes into account the time required for: the formation of the second cake, pressing of the cake, washing with acidic wash water and water, pressing of the cake, and air drying. When no re-slurrying step was used, the filtration rate ranged from 90 to 260, especially 100 to 240 kg/m²·h. In addition, as shown in Table 1, following black liquor oxidation, the carbon dioxide needed to reach the target pH of 10 for lignin precipitation was reduced significantly. This might be due to the oxidation of TRS compounds some of which are known to consume sodium hydroxide as well as organics present in black liquor and, in particular, carbohydrates which, upon oxidation, generate carboxylic acid groups which consume alkalinity in the residual black liquor.

These results clearly show the beneficial effect of black liquor oxidation on any subsequent filtration steps. In an effort to identify the reason for the improved filtration rates, Scanning Electron Microscopy (SEM) was used to evaluate the size and morphology of the lignin particles recovered from the acidification of oxidized and non-oxidized black liquors. The lignin final product from both these processes was evaluated as well.

Figure 2A:
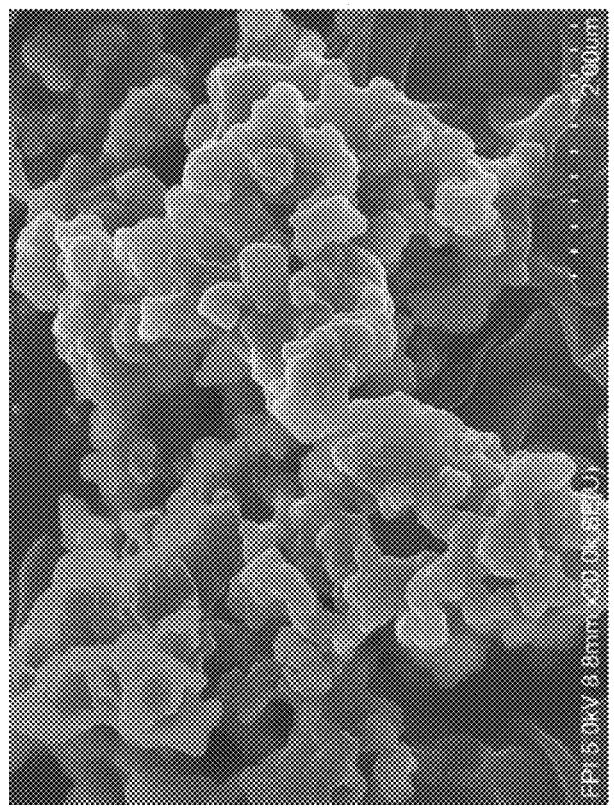
FIG. 2a is an SEM image of lignin in lignin slurry obtained from non-oxidized black liquor solution after acidification to pH 10 using carbon dioxide.

FIG. 2a shows that after acidification of the non-oxidized black liquor to pH 10 using carbon dioxide, the coagulated lignin slurry (before the first filtration) is composed of very small lignin particles (about 0.2-0.5 µm average diameter in size). In the case of oxidized black liquor (FIG. 2b), however, the slurry appears to be composed of lignin particles which are larger in size (about 0.5 to 1 µm average diameter).

Figure 3B:
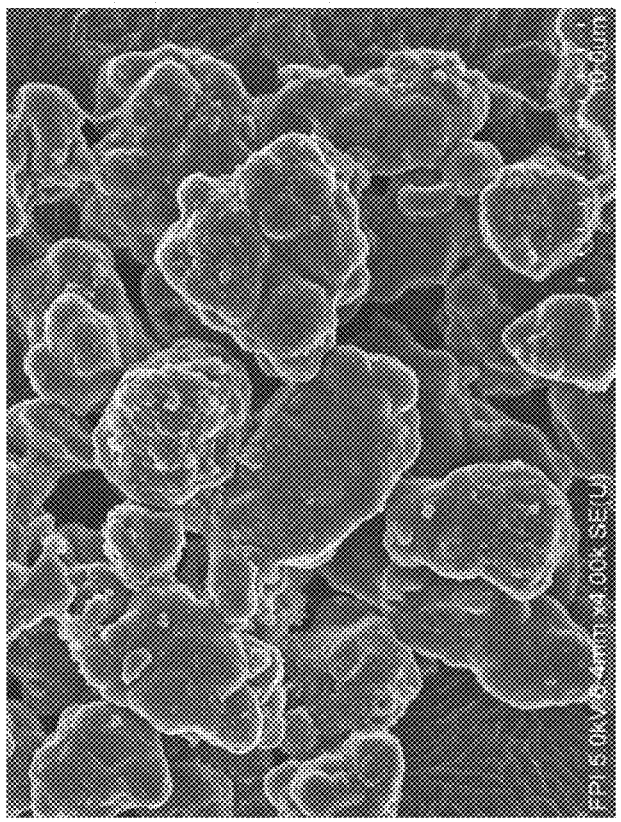
FIG. 3b is an SEM image of lignin product recovered from oxidized liquor solution after acidification to pH 10 using carbon dioxide, followed by coagulation, filtration, suspension of the cake in sulphuric acid, filtration and washing.
Figure 3A:
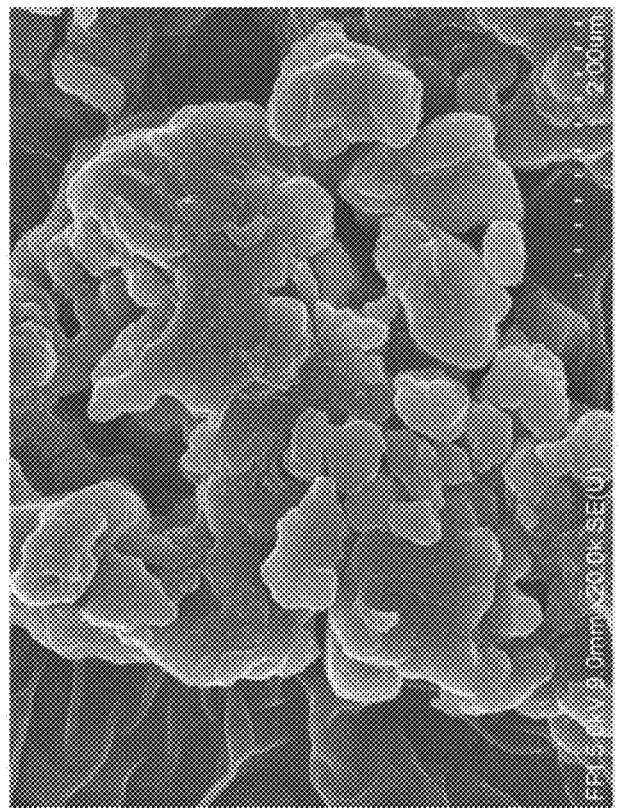
FIG. 3a is an SEM image of lignin product recovered from non-oxidized black liquor solution after acidification to pH 10 using carbon dioxide, followed by coagulation, filtration, suspension of the cake in sulphuric acid, filtration and washing.

Similarly, SEM images of the final lignin product from the untreated (unoxidized) black liquor (FIG. 3a), show small particles of about 0.2-1.0 µm average diameter whereas in the case of lignin derived from oxidized black liquor (FIG. 3b), the SEM images show that the lignin is made up of larger particles of about 5 to 10 µm average diameter in size. This could explain the high filtration rate of the slurry recovered from the oxidized black liquor as compared to the untreated (unoxidized) one.

It should be pointed out here that despite the larger particle size, the lignin produced from the oxidized black liquor was not less pure from the lignin produced from untreated black liquor (please see Table 2). The ash content was quite low at about 0.18% as compared to 0.07% for the lignin produced from untreated black liquor. Its lignin content was 98.03% as compared to 97.06% for the lignin produced from untreated black liquor. In addition, the elemental analysis of the two lignins with respect to C, O, H and N was quite similar.

In order to evaluate the effect of black liquor oxidation on the structure of the lignin, the Mw and MWD of lignin were measured using Size Exclusion Chromatography (SEC). The lignin samples were acetylated and then dissolved in THF prior to injection into a liquid chromatograph (LC) equipped with three SEC columns connected in series with exclusion limits ranging from 50 to 1M Dalton. In this set-up, the separated lignin components were directed through three detectors connected in series: UV: Ultraviolet (254+280 nm), MALLS=Multi-Angle Laser Light Scattering, and RI: Refractive Index. Table 2 shows the Mw and MWD of lignins recovered from untreated and pre-treated black liquors, respectively, based on the results obtained from the MALLS and UV detectors, respectively. Based on the results presented in Table 3, it appears that there is no major change in the lignin structure since no large difference was seen in Mw, Mn and by extension, Mw/Mn, when the lignin is produced from non-oxidized or oxidized black liquor or even when the lignin is converted from the sodium to the hydrogen form in these two cases.

Furthermore, preliminary results relating to the main functional groups in the two lignins under examination, appear to suggest that there is no major difference between the number of carboxylic acid, phenolic hydroxyl and aliphatic hydroxyl groups in the two lignins.

In summary, the black liquor pretreatment approach of the invention enables an increase, for example a two to three-fold increase, in lignin slurry filtration rates (both under alkaline and acidic conditions) without compromising lignin purity and/or affecting lignin structure and chemistry (e.g. lignin MWD or main functional groups). In addition, this approach reduces acid requirements during the lignin precipitation and washing steps while minimizing and/or eliminating TRS emissions from all processing steps.

Thus the process of the invention provides a filtering rate of precipitated lignin particles greater than the filtering rate for a corresponding non-oxidized, acidified black liquor, i.e. the same black liquor but without the oxidizing pretreatment. In addition, the process of the invention provides lignin particles which are of larger particle size than lignin particles filtered from a corresponding non-oxidized, acidified black liquor, i.e. the same black liquor but without the oxidizing pretreatment. Furthermore, the process of the invention provides a lignin product of a higher dry solids content than the lignin produced from unoxidized black liquor.

TABLE 1

Chemical requirements of the two lignin recovery processes
(with and without black liquor oxidation)

|  | Untreated black liquor | Pre-treated black liquor |
|---|---|---|
| Carbon dioxide (kg/kg of lignin) | 0.50-0.60 | 0.35-0.45 |
| Sulfuric acid (kg/kg of lignin) | 0.30-0.40 | 0.25-0.35 |
| Water wash (kg/kg of lignin) | 10-15 | 10-15 |

TABLE 2

Chemical composition of lignins produced from
untreated and treated black liquor

|  | Lignin from untreated black liquor | Lignin from treated black liquor |
|---|---|---|
| Solids, % | 44.2 | 55.9 |
| Ash, % | 0.07 | 0.18 |
| Organics, % | 99.93 | 99.82 |
| UV lignin, % | 97.06 | 98.03 |
| HHV, BTU/lb | 12119 | 11983 |
| C, % | 68.6 | 66.6 |
| H, % | 6.20 | 5.76 |
| N, % | <0.1 | <0.1 |
| O, % | 23.9 | 22.2 |

TABLE 3

Mw, Mn and MWD of lignin recovered from oxidized and
non-oxidized black liquor solutions

| | | Lignin source | | | |
|---|---|---|---|---|---|
| | | Non-oxidized Black liquor | | Oxidized Black liquor | |
| | | Na-lignin | H-lignin | Na-lignin | H-lignin |
| MALLS detector | Mw | 10600 | 10400 | 10330 | 12000 |
| | Mn | 6547 | 5139 | 4881 | 5698 |
| | Mw/Mn | 1.69 | 2.15 | 2.12 | 1.97 |
| UV detector | Mw | 4206 | 4425 | 4880 | 5212 |
| | Mn | 1143 | 1224 | 1300 | 1416 |
| | Mw/Mn | 3.68 | 3.62 | 3.75 | 3.68 |

The invention claimed is:

1. In a process for removing lignin from black liquor by acidifying the black liquor with an acidifier and filtering the acidified black liquor, the improvement wherein the black liquor is oxidized in a step consisting essentially of oxidation prior to said acidifying and filtering to eliminate total reduced sulphur (TRS) in the black liquor with oxidation of sulphides, mercaptans and disulphides by said oxidation at a temperature effective for said oxidation to thiosulphate and other oxidized sulphur compounds and oxidation of said thiosulphate to sulphate, and such that hemicelluloses and other organics in the black liquor are oxidized by said oxidation at said temperature to form an acidifying agent selected from isosaccharinic acids, acetic acid, formic acid, lactic acid, oxalic acid, carbon dioxide and acidic lignin degradation products and mixtures thereof, with generation of heat through said oxidation, the generated heat leading to the creation of nucleation sites for the formation of lignin particles through lignin colloid agglomeration and coagulation, of a size easy to filter and wash, said acidifying agent reducing the acidifier requirement for said acidifying.

2. The process of claim 1, wherein the acidifying is to a black liquor pH of not more than 10.8.

3. The process of claim 1, wherein said acidifier requirement is reduced by at least 10% to 40% by said acidifying agent.

4. A process for separating lignin from black liquor comprising:
   a) in a step consisting essentially of oxidation, the black liquor containing lignin is oxidized with formation of an oxidized black liquor to remove total reduced sulphur (TRS) in the black liquor with oxidation of sulphide in said black liquor at a temperature effective for oxidation to thiosulphate and oxidation of said thiosulphate to sulphate and such that hemicelluloses and other organics in the black liquor are oxidized by said oxidation at said temperature to form an acidifying agent with generation of heat through said oxidation, and allowing the generated heat to create a nucleation sites for the formation of lignin particles of a size easy to filter and wash,
   b) subsequently, acidifying the oxidized black liquor to precipitate lignin from the black liquor, and
   c) filtering precipitated lignin particles from the acidified liquor of step b).

5. The process of claim 4, further including:
   d) washing the lignin recovered from step c) with a strong acid and water to produce a purified lignin product.

6. The process of claim 4, wherein the acidifying is to a black liquor pH of not more than 10.8.

7. The process of claim 4, wherein the filtering is at a filtering rate greater than the filtering rate for a corresponding non-oxidized, acidified black liquor.

8. The process of claim 4, wherein the lignin particles are of a larger particle size than lignin particles filtered from a corresponding non-oxidized, acidified black liquor.

9. The process of claim 4, wherein the dry solids content of the lignin product is higher than that from a corresponding non-oxidized, acidified black liquor.

10. The process of claim 4, wherein the acidifying in step b) is with an acidifier selected from carbon dioxide and sulphuric acid and the washing is with sulphuric acid.

11. The process of claim 10, wherein the acidifying in step b) is with an acidifier selected from carbon dioxide contained in a flue gas or the gaseous emissions from an effluent treatment system and the sulphuric acid used is that contained in a spent acid from a chlorine dioxide generator, a tall oil plant and/or a demineralizer plant.

12. The process of claim 4, wherein the acidifying is with sulphur dioxide, organic acids or acid contained in a hydrolysate from the pre-hydrolysis of wood chips prior to pulping.

13. The process of claim 12, wherein the hydrolysate from the pre-hydrolysis of wood chips prior to pulping is obtained using steam, water or sulphuric acid.

14. The process of claim 4, wherein the acidifying agent is selected from isosaccharinic acids, acetic acid, formic acid, lactic acid, oxalic acid and carbon dioxide.

15. The process of claim 14, wherein the acidifying agent participates in the acidifying whereby the acidifier is employed in an amount less than that for acidification of a corresponding non-oxidized, black liquor.

16. The process of claim 4, wherein said lignin particles in c) have a size of 5 to 10 μm average diameter.

17. The process of claim 14, wherein said lignin particles in c) have a size of 5 to 10 μm average diameter.

18. The process of claim 15, wherein said acidifier requirement is reduced by at least 10% to 40% by said acidifying agent.

\* \* \* \* \*